Aug. 18, 1970　　　　P. G. D. BORS　　　　3,524,353
METHOD AND DEVICE FOR THE EXAMINATION OF BITUMEN
Filed April 8, 1968　　　　　　　　　　　　4 Sheets-Sheet 3

Aug. 18, 1970　　　P. G. D. BORS　　　3,524,353
METHOD AND DEVICE FOR THE EXAMINATION OF BITUMEN
Filed April 8, 1968　　　　　　　　　　4 Sheets-Sheet 4

United States Patent Office 3,524,353
Patented Aug. 18, 1970

3,524,353
METHOD AND DEVICE FOR THE EXAMINATION OF BITUMEN
Petrus Gerlachus Desiderius Bors, Pastoor Strassenstraat 14, Venlo-Blerick, Netherlands
Filed Apr. 8, 1968, Ser. No. 719,646
Claims priority, application Belgium, Apr. 7, 1967,
P 508, P 509, P 510
Int. Cl. G01d 21/00
U.S. Cl. 73—432
16 Claims

ABSTRACT OF THE DISCLOSURE

A method and apparatus for determining the number of various sized particles in a bituminous mixture. First a suitable solvent and the mixture to be analyzed are placed in a horizontal agitating drum where the solvent with the rotary agitation demixes the bitumin. The agitator is provided with suitable sieves so that in a later centrifugal cycle the solvent and smaller particles are removed, the larger particles remaining in the drum. The solvent and smaller particles are then conveyed to a second centrifugal separator where the smaller particles are filtered. The entire apparatus is sealed to prevent the escape of solvent vapors.

---

The invention relates to a method and a device for carrying out this method for determining the content and the granulometric composition of the unsoluble constituents of bitumen by dissociating the soluble and the unsoluble constituents by means of a solvent in a "demixer" comprising a rotatable drum having a removable lid and provided with filtering elements and for separating the liquid phase from the unsoluble constituents, which are subsequently determined granulometrically by sieving.

In a known method the bitumen is "demixed" in a drum having a vertical rotary shaft. This drum is widened in upward direction and closed by a lid, between which the filtering element is arranged. The lid is centrally provided with a supply duct for the solvent, which passes through the filtering element. By the rotation of the drum the bitumen is "demixed" and the soluble bitumen fraction rises together with the solvent along the upwardly widening walls and penetrated the filtering element, which retains the solid constituents. After the evaporation of the solvent the dissociated solid constituents are separated by sieves into different granulometric fractions, which are subsequently weighed.

During the sieving operation, however, problems arise since the filling substance of the bitumen, that is to say, combustion dust of very small size can be sieved only very slowly from the other constituents. Because of the long sieving operation the total time of the analysis is comparatively long, i.e. about 2 hours. A further disadvantage resides in that the weight of the samples allowed to be treated in the known device is restricted to about 1 kg. so that the sample analysed will often not be representative of the bulk of the bitumen.

These disadvantages are obviated by a method according to the invention which is characterized in that demixing is performed with an approximately horizontal position of the rotary shaft of the drum, which is, in addition, a centrifugal drum, whilst the particles having a smaller diameter than a given value, together with the solvent and the soluble bitumen fraction leave the demixer through sieves or filters retaining the larger particles and are led to a centrifugal separator comprising removable cups, in which the solid particles are arrested and the cleared liquid is conducted away, and at the termination of the demixing operation the solid constituents left in the drum are centrifuged.

When volatile, toxic solvents, usually chloroethene, are employed, the method according to the invention will preferably be carried out in an airtight apparatus, whilst the vapours evolving during the operation are conducted away to the outside through vapour-liquid separators.

Since in the method according to the invention the fine filling substance is separated out already prior to the sieving operation, no problems are any longer involved in sieving. The demixing operation is, moreover, performed more rapidly, since in the horizontally arranged drum mixing of the solid substance and the solvent is performed much more thoroughly, whilst, in addition, a larger sample, for example of 6 kgs., can be treated so that a greater similarity with the whole bituminous substance is obtained; the latter is particularly important for judging about the properties of a road covering.

The method according to the invention may be further improved by employing a demixer whose drum can be removed, so that the removal of the solid substance left therein after demixing is extremely facilitated.

Charging of the drum can be facilitated, when the drum permits of being tilted about an axis at right angles to the axis of rotation of the drum. After the drum is filled, it is returned to the horizontal position at the start of the demixing operation.

The method according to the invention is preferably carried out at a slightly higher temperature, which considerably accelerates the demixing effect.

The device for carrying out the method comprises a demixer having a housing provided with a lid with a rotatable drum, connected with a driving member and provided with a removable lid and filtering elements, a supply duct for a solvent connected with the drum and an outlet duct connected with the housing and is characterized in that the rotary shaft of the drum, which forms at the same time a centrifugal drum, is arranged horizontally and the driving member is adapted to rotate with at least two driving speeds, the demixer comprising sieves or filters having such passage that particles falling below a given diameter together with the solvent and the soluble bitumen fraction can be conducted away through the outlet duct, the device comprising a centrifugal separator having removable cups and connected with the outlet duct of the demixer and having an outlet duct for the cleared liquid.

When a volatile, toxic solvent is used, the device according to the invention will preferably be constructed so that the demixer and the separator can be closed in an airtight manner; whilst in the duct between the demixer and the separator and in the outlet duct of the separator gas-liquid separators are provided.

The sieves will be disposed so that during the demixing and the subsequent centrifugal operations the liquid containing the finest fractions of the solid constituents can readily flow away. According to the invention the drum may be constructed as a closed cylinder, whilst the drum lid is provided near its periphery with sieves. An improved embodiment according to the invention is obtained by arranging in the drum a second drum which is fastened in the lid of the first drum and provided with perforations, whilst it can be closed by a lid. Owing to the perforations of said drum the centrifugal operation is performed very rapidly and since the sieves cannot come into contact with the coarse solid particles arrested by the perforations any risk of damage is excluded.

According to the invention the sieves will preferably be arranged in hollow screw caps adapted to be screwed into tapped bores.

It is furthermore advantageous to facilitate the removal of the solid parts from the drum by adapting the demixer drum to be detachable. In a preferred embodiment of the invention this is achieved by arranging in the lid of the demixer the drive of the drum formed by a conical spindle and a catch adapted to engage corresponding holes provided in the rear side of the drum. In this embodiment the drum can be removed by opening the lid.

According to the invention the housing of the demixer is preferably supported by a rotatable shaft at right angles to the rotary shaft of the drum. This arrangement facilitates materially filling of the drum.

Usually the demixing device according to the invention will be equipped with a heating device.

The invention will now be described more fully with reference to an embodiment and the accompanying drawings. In the drawings.

Figure 1:
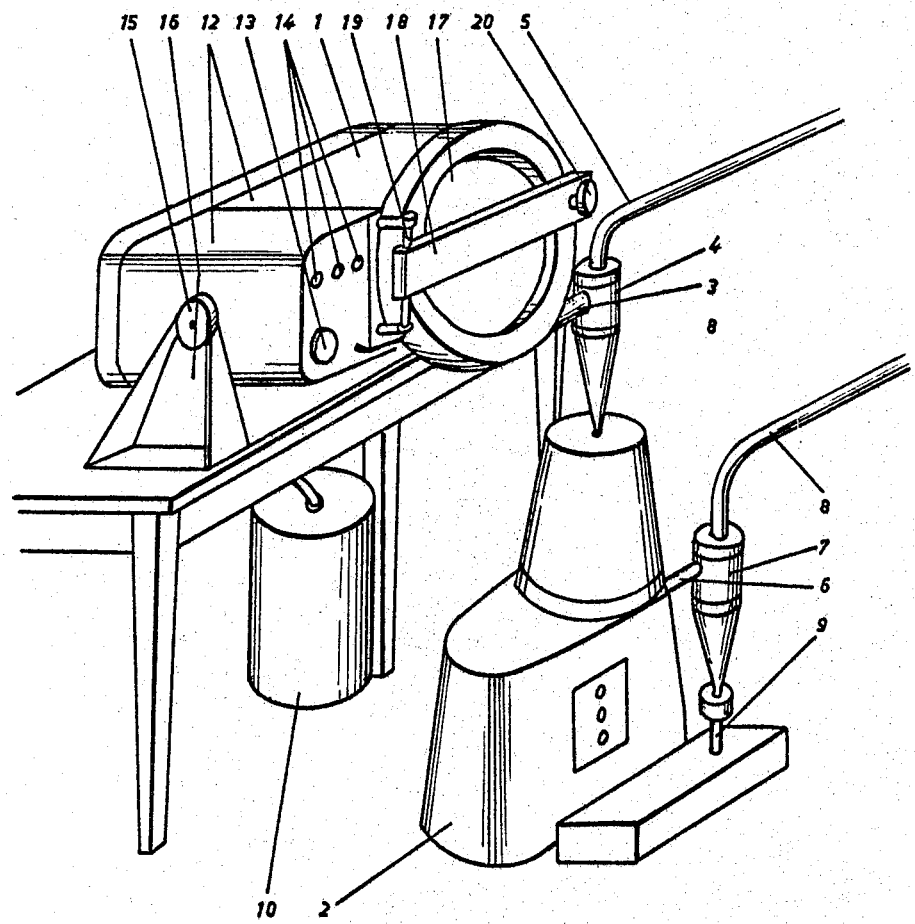
FIG. 1 is a perspective view of the device according to the invention.
Figure 2:
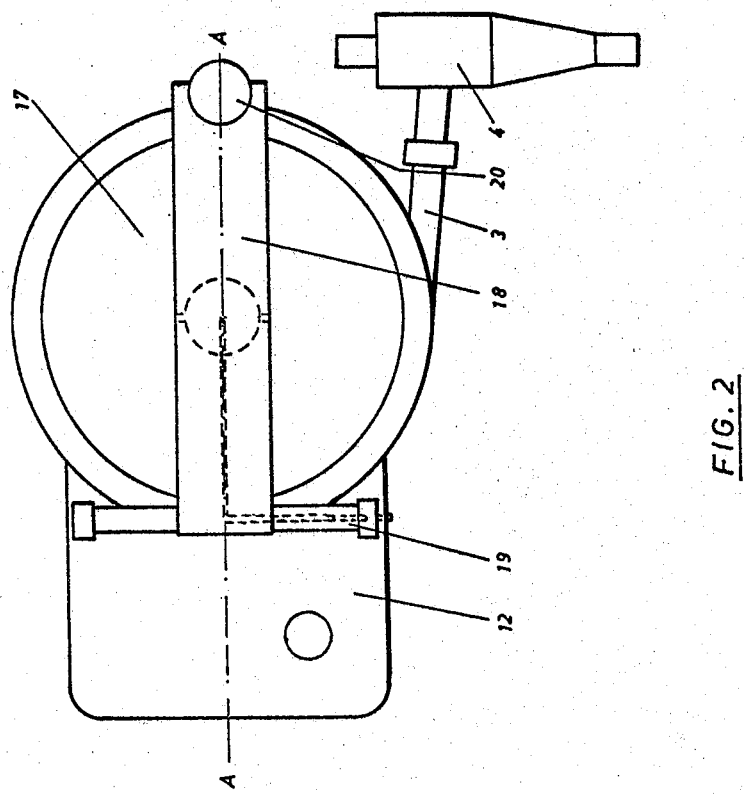
FIG. 2 is a front view of the demixer according to the invention.

The demixer shown in FIG. 1 comprises a demixer 1 and a separator 2. The demixer communicates by an outlet duct 3 through a gas-liquid separator 4 having an outlet duct 5 for the vapours with the separator 2. The cleared liquid leaves the separator 2 along a duct 6, which opens out in a second gas-liquid separator 7 having a gas outlet duct 8 in an outlet duct 9 for the cleared liquid. The solvent is sucked by a pump from a supply vessel 10. The housing 12 of the demixer accommodates the driving motor with the associated control-apparatus and the pump. The front wall of the housing 12 is provided with a control-knob 13 for the adjustment of the speed of the motor and with a few signalling lamps 14. The housing 12 is furthermore adapted to turn in bearings 15 of supports 16. The demixer 1 can be closed by an external lid 17, fastened to an arm 18, which is adapted to pivot about a hinge 19, the lid being closed by a closing member 20.

Figure 3:
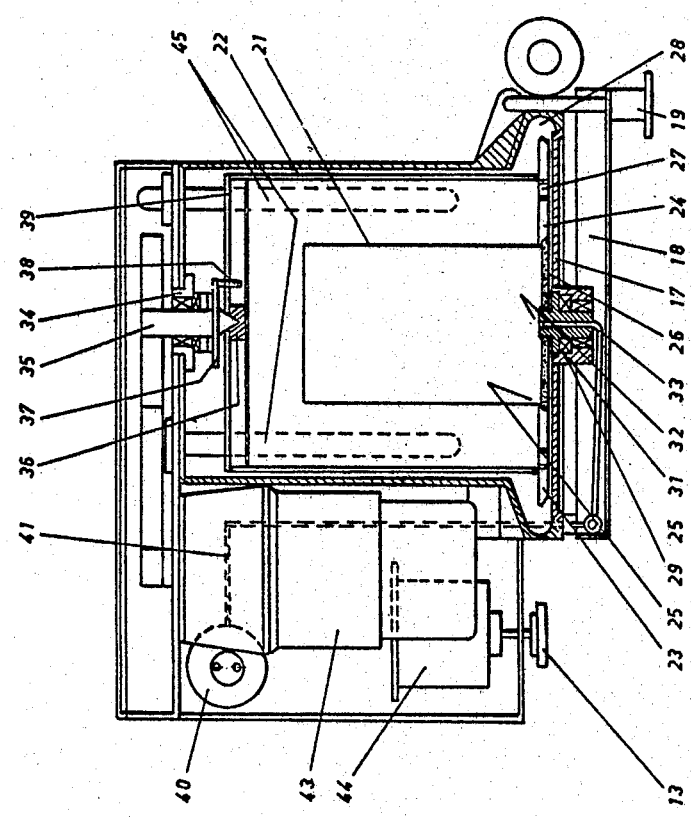
FIG. 3 is a sectional view of the demixer shown in FIG. 2 taken on the line A—A.

The internal construction of the demixer 1 is represented in FIG. 3. The demixing operation is carried out in a drum comprising an inner drum 21 with perforations, surrounded by a second drum 22. The drum 22 is closed by a lid 23, provided on the inner side with a collar 24, on which bears the bent-over rim 25 of the inner drum 21. The opening of the inner drum is closed by a lid 26.

The liquid and the finest particles leave the demixing drum through sleeves 27, which are arranged at regular intervals along the periphery of the lid 23 and which are formed by hollow screw caps comprising a shifting gauze, said constituents flowing away through a helical duct 28 and a duct 3 to the gas-liquid separator 4. The arm 18 of the external lid is provided with a bearing sleeve 29, in which a spindle 30 with a collar 31 is adapted to rotate. The spindle 30 is tapering to the front and fits in a correspondingly shaped recess 32 of the lid 26 and has a central bore 33 for the supply of a solvent. On the rear side of the demixing drum a bearing sleeve 34 is provided for holding the driving shaft 35. The driving shaft 35 is tapering to the front and fits in a hollow spindle 36 of the drum 22. The driving shaft has furthermore a collar 37 to which a pin 38 is secured, which is adapted to engage openings provided in a double external bottom 39 arranged behind the drum 22. The solvent is pumped by a pump 40 from the reservoir 10 and passes through a duct 41 across the spindle of the hinge 19 and the arm 18 through the bore 33 into the drum 21. The mixing drum is driven by a D.C. motor 43 controlled by a control means 44 via an adjustable belt transmission 42. The mixing device may furthermore be heated by the thermostat-controlled heating elements 45.

Figure 4:
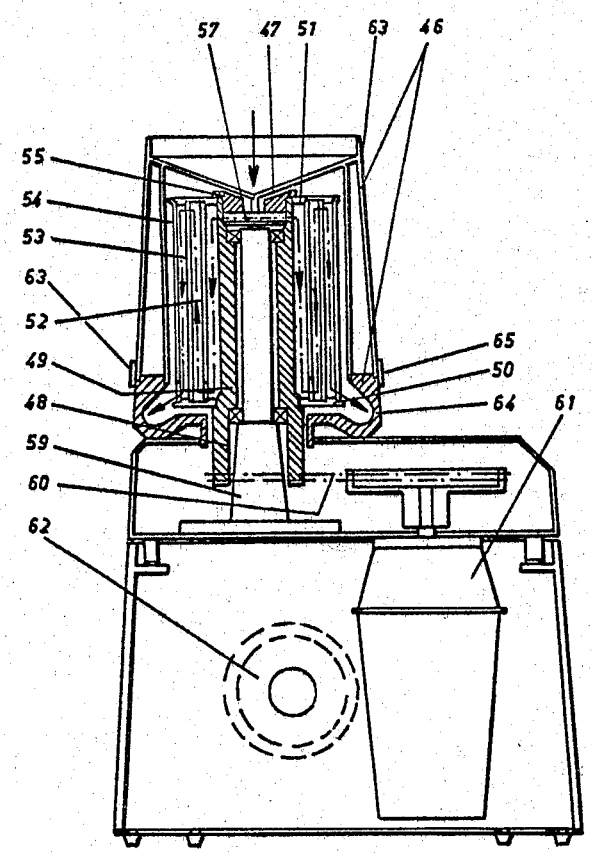
FIG. 4 is a longitudinal sectional view of the separator.

The separator is shown in a longitudinal sectional view in FIG. 4 and comprises a housing 46 having a closable lid beneath which a sieve 47 is arranged. The separator comprises a central shaft 48 with a collar 49, on which bears a plate 50. At the upper end of the central shaft 48 a second plate 51 is held in place. The plates 50 and 51 are provided with recesses accommodating three cups 52, 53 and 54. The cups 52, 53 and 54 are fixed between the plates 50 and 51 by a nut 55 adapted to be screwed into a tapped bore 56 of the shaft 48. The central shaft 48 has a transverse bore 57, along which the liquid can flow to the first separation cup. The path covered by the liquid in the separator is indicated by arrows and the cleared liquid finally enters a cylindrical space 58, from where it flows to the gas-liquid separator 7 via the duct 6 (FIG. 1). The central shaft 48 is hollow and is held by a supporting shaft 59, which can be driven via a belt transmission by a D.C. motor 61, the speed of which can be regulated by a control means 62. In order to facilitate dismounting of the separator the housing 46 is constructed in two portions, the upper portion, the hood 63, being fastened to the lower portion 64 by a clamping member 65. In the separator cups 52, 53, 54 paper sleeves may be provided for collecting the solid substance, which can finally be taken out and weighed. The device operates as follows:

After the inner drum 21 is filled with the bitumen substance, the solvent (chloroethene) is added and the heating member is switched on. The control means is adjusted to a position such that the number of revolutions is about 60 rev./min. As the demixing progresses the released solid constituents pass through the perforations into the drum 22, whilst the finest particles together with the liquid are conducted away to the separator. At the end of the demixing operation the centrifugal operation is carried out with a speed of rotation of 600 rev./min. After this treatment the lid 17 is opened, the drums 21 and 22 are removed, the solid substance is collected, dried and then determined granulometrically.

The solid substance collected in the paper sleeves in the separator cups is dried and then weighed. The speed of the separator is 6000 rev./min.

I claim:

1. Method for determining the content and granulometric composition of the insoluble constituents of bitumen comprising the steps of, demixing the soluble and the insoluble constituents of bitumen with a solvent in a rotatable drum of a demixer, rotating said drum at a relatively low speed during the demixing for separating the particles of a smaller diameter than a given value together with the solvent and the soluble bitumen fraction, feeding said particles the solvent and the soluble bitumen through sieves which retain the larger portions to a centrifugal separator, after separation rotating the drum at a relatively high speed for some time, collecting the larger portions out of the drum and drying and determining them granulometrically, collecting the smaller particles out of the separator and drying and weighing said particles.

2. The method of claim 1, characterized in that it is carried out in a device closed in an airtight manner, and conducting the vapors evolved to the outside through vapor-liquid separators.

3. The method of claim 1, characterized in that before said separation the drum is rotated at approximately 60 r.p.m., and after said separation the drum is rotated at approximately 600 r.p.m.

4. The method of claim 1, wherein the contents of the drum is heated.

5. The method of claim 1, wherein said drum is rotated about a substantially horizontal axis.

6. Apparatus for demixing the soluble and insoluble constituents of bitumen with a solvent comprising, a housing provided with a lid, a centrifugal drum journalled in said housing for rotation about a substantially horizontal axis, means for rotating said drum at at least two speeds, a supply duct for supplying solvent to the drum, an outlet duct, sieves in said drum provided with openings such that particles below a given diameter together with solvent and the soluble fraction pass through said openings to said outlet duct, said duct communicating with a centrifugal separator, said centrifugal separator having removable cups and a further outlet duct for removal of the cleared liquid from the separator.

7. The apparatus of claim 6, wherein said drum is removably mounted in said housing.

8. The apparatus of claim 6, wherein said drum is mounted for tilting about an angle of 90° for loading.

9. The apparatus of claim 6, wherein heating means is provided for heating the contents of the drum.

10. The apparatus of claim 6, wherein said drum is a closed cylinder and is provided with a lid, and said sieves are disposed adjacent the periphery thereof.

11. The apparatus of claim 10, wherein said sieves include hollow screw caps, and said caps are threadedly received in tapped bores provided in said lid.

12. The apparatus of claim 6, wherein said drum includes a second drum provided with perforations contained within said first drum and rotatable therewith.

13. The apparatus of claim 12, wherein said second drum is secured to the lid of the first drum positioned with said sieves between the first and second drums, said second drum being also provided with a lid.

14. The apparatus of claim 6, wherein said cups include sleeves fabricated of paper.

15. Apparatus for demixing the soluble and insoluble constituents of bitumen with a solvent comprising, a housing provided with a lid, a centrifugal drum journalled in said housing for rotation about a substantially horizontal axis, a second drum provided with perforations arranged coaxially within said first drum, means for rotating said two drums together about said axis of rotation at at least two different speeds, a supply duct for supplying a solvent within said second drum, an outlet duct, sieves disposed between said first and second drums, said sieves being provided with openings such that particles below a given diameter together with solvent and the soluble fraction can flow out of said drums to said outlet duct, said outlet duct communicating with said housing and with a centrifugal separator, said centrifugal separator being provided with removable cups and a further outlet duct for removal of cleared liquid from the separator.

16. The apparatus of claim 15, wherein said cups include sleeves fabricated of paper.

References Cited

UNITED STATES PATENTS

| | | | |
|---|---|---|---|
| 3,203,253 | 8/1965 | Scheid | 73—432 |
| 2,264,223 | 11/1941 | Stancliffe | 209—291 |
| 3,223,239 | 12/1965 | Dick | 209—291 |

S. CLEMENT SWISHER, Primary Examiner

U.S. Cl. X.R.

209—291, 303